(12) United States Patent
Choltco-Devlin et al.

(10) Patent No.: US 12,162,564 B2
(45) Date of Patent: Dec. 10, 2024

(54) CRANK PRELOAD COLLAR ASSEMBLY

(71) Applicant: Fox Factory, Inc., Duluth, GA (US)

(72) Inventors: Evan Michael Choltco-Devlin, North Vancouver (CA); Fraser Andrew, Burnaby (CA)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/869,182

(22) Filed: Jul. 20, 2022

(65) Prior Publication Data

US 2023/0026821 A1 Jan. 26, 2023

Related U.S. Application Data

(60) Provisional application No. 63/223,934, filed on Jul. 20, 2021.

(51) Int. Cl.
| | |
|---|---|
| *B62M 3/00* | (2006.01) |
| *B25B 5/08* | (2006.01) |
| *B62M 1/36* | (2013.01) |
| *F16B 2/18* | (2006.01) |

(52) U.S. Cl.
CPC .............. *B62M 3/00* (2013.01); *B25B 5/08* (2013.01); *B62M 1/36* (2013.01); *F16B 2/185* (2013.01); *B62K 2206/00* (2013.01)

(58) Field of Classification Search
CPC .......... B62M 1/36; B62M 3/00; B62M 3/003; B62M 19/34; B62K 19/34; B62K 2206/00; F16B 2/185; B25B 5/04; B25B 5/08

See application file for complete search history.

(56) References Cited

U.S. PATENT DOCUMENTS

| | | | | |
|---|---|---|---|---|
| 496,132 | A * | 4/1893 | Perkins | B62K 19/34 384/458 |
| 535,706 | A * | 3/1895 | Luther | B62M 3/003 74/594.2 |
| 548,592 | A * | 10/1895 | Rau | B62M 3/003 74/594.2 |
| 596,550 | A * | 1/1898 | Siglow | B62M 3/003 74/594.2 |
| 599,652 | A * | 2/1898 | Hunt | B62K 19/34 384/458 |

(Continued)

FOREIGN PATENT DOCUMENTS

| | | | |
|---|---|---|---|
| BR | 102018003141 A2 * | 9/2019 | |
| CN | 115009409 A * | 9/2022 | |
| FR | 2885344 A1 * | 11/2006 | B62H 5/001 |

OTHER PUBLICATIONS

"Shaft Collars," Ruland Product Page, dated by Wayback Machine to Nov. 11, 2020, url:<https://web.archive.org/web/20201111162945/https://www.ruland.com/shaft-collars.html>.*

(Continued)

*Primary Examiner* — Adam D Rogers

(57) ABSTRACT

A crank preload collar assembly is disclosed. The crank preload collar assembly includes a preload collar body having an axial opening therein to fit around a spindle of a crank assembly. The crank preload collar assembly also includes a clampable opening formed in a portion of the preload collar body. A cam lever is coupled with both sides of the clampable opening, wherein the cam lever provides a clamping force to the preload collar body with respect to the spindle.

4 Claims, 5 Drawing Sheets

(56) References Cited

U.S. PATENT DOCUMENTS

| | | | | |
|---|---|---|---|---|
| 607,055 A * | 7/1898 | Knape | B62K 19/34 | 384/385 |
| 625,038 A * | 5/1899 | Kolb | B62K 19/34 | 384/458 |
| 634,256 A * | 10/1899 | Atherton | B62M 3/003 | 74/594.2 |
| 643,349 A * | 2/1900 | Fauber | B62M 3/003 | 74/594.2 |
| 648,077 A * | 4/1900 | Ludlow | F16C 19/54 | 74/594.2 |
| 651,668 A * | 6/1900 | Latta | B62K 19/34 | 384/458 |
| 652,865 A * | 7/1900 | Scovill | B62M 3/003 | 74/594.2 |
| 670,519 A * | 3/1901 | Scovill | B62M 3/003 | 74/594.2 |
| 903,392 A * | 11/1908 | Meiser | B62K 19/34 | 384/458 |
| 2,257,401 A * | 9/1941 | Schwinn | B62K 19/34 | 74/594.1 |
| 2,314,133 A * | 3/1943 | Duffy | B62K 19/34 | 384/458 |
| 4,358,967 A * | 11/1982 | Kastan | B62K 19/34 | 74/594.1 |
| 4,552,468 A * | 11/1985 | Hopper, Jr. | B62K 19/34 | 384/585 |
| 5,303,611 A * | 4/1994 | Chi | B62K 21/06 | 403/90 |
| 5,549,396 A * | 8/1996 | Chiang | B62M 3/003 | 384/540 |
| 5,924,801 A * | 7/1999 | Chi | F16C 19/163 | 384/510 |
| 5,997,104 A * | 12/1999 | Campagnolo | F16C 35/073 | 301/59 |
| 6,164,157 A * | 12/2000 | Chen | B62M 3/003 | 74/594.1 |
| 6,244,750 B1 * | 6/2001 | Chiang | B62K 19/34 | 384/458 |
| 6,367,352 B1 * | 4/2002 | Niculescu | B62M 1/36 | 474/69 |
| 8,256,983 B2 * | 9/2012 | Lin | B62K 25/02 | 403/322.4 |
| 10,953,693 B2 * | 3/2021 | Thorpe | B60B 27/026 | |
| 11,724,766 B2 * | 8/2023 | Munro | B62K 21/125 | 74/551.8 |
| 2002/0033069 A1 * | 3/2002 | Sechler | B62M 3/00 | 74/594.1 |
| 2007/0271745 A1 * | 11/2007 | Frey | F16B 2/185 | 24/568 |
| 2008/0164673 A1 * | 7/2008 | Lane | B62M 3/003 | 280/259 |
| 2014/0157951 A1 * | 6/2014 | Dubois | F16C 25/06 | 29/898.07 |
| 2015/0007689 A1 * | 1/2015 | Chonan | F16H 55/30 | 74/594.2 |
| 2016/0096588 A1 * | 4/2016 | Romeo | B62M 1/36 | 474/84 |

OTHER PUBLICATIONS

"Lock-Jaw PRO 2," Amazon Product Page, first available for sale on Amazon on Nov. 6, 2016, url:<https://www.amazon.com/Lock-Jaw-Barbell-Collar-50mm-Blue/dp/B01N09NKVL/ref=cm_cr_arp_d_product_top?ie=UTF8&th=1>.*

"What Is a Threaded Shaft Collar," Blog Post on Stafford Company Page, published Mar. 17, 2021, url:<https://www.staffordmfg.com/blog/what-is-a-threaded-shaft-collar/>.*

"Shaft collar," Wikipedia Page, dated by Wayback Machine to Sep. 21, 2020, url:<https://web.archive.org/web/20200921200002/https://en.wikipedia.org/wiki/Shaft_collar>.*

* cited by examiner

CRANK PRELOAD COLLAR ASSEMBLY

CROSS-REFERENCE TO RELATED APPLICATIONS (PROVISIONAL)

This application claims priority to and benefit of U.S. Provisional Patent Application No. 63/223,934 filed on Jul. 20, 2021, entitled "CRANK PRELOAD COLLAR ASSEMBLY" by Choltco-Devlin et al., and assigned to the assignee of the present application, the disclosure of which is hereby incorporated by reference in its entirety.

FIELD OF THE INVENTION

Embodiments of the invention generally relate to a crank preload collar for a pedal driven vehicle.

BACKGROUND

On a pedal vehicle, such as a bicycle, electric bicycle (eBike), moped, or the like, crankset/bottom bracket assemblies need some amount of axial load applied between the crank arms and the bottom bracket to take up manufacturing tolerances and prevent unwanted movement. Many of the current embodiments of crank preloaders utilize a threaded interface along the same axis of the crank spindle. This threaded interface allows for precise adjustment of axial load applied to the assembly. To fix the position of the preloader on the threads current embodiments use a spring or elastomeric to apply an axial load and hence friction to the threads, a split in the threads and a second threaded fastener which applies circumferential load to the threads across the split, or a detent system that isolates the preload collar from rotation forces. The threaded fastener solutions provide adequate fixing of the preloader's position though their problem is the secondary fastener is often small and requires a tool to adjust, which can be a hassle for the user. The current solutions that don't use fasteners often do not provide adequate positional fixing for the preloader and can be knocked out of place easily.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Embodiments described herein provide a preload collar assembly for a pedal driven vehicle. In general, a pedal driven vehicle refers to a vehicle that includes a crank assembly with at least one pedal arm and a drive ring (such as a chain ring, belt drive ring, shaft ring, etc.). The crank assembly receives an input force (from an engine, a human working the pedals, or the like) that causes the drive ring to rotate (at a certain speed, with a certain amount of force, etc.). The drive ring is coupled to a transfer system (such as a roller chain, belt, shaft, or the like), which transfers the force from the drive ring to the drive system of the vehicle. In different embodiments, the force transfer could be backward, forward, up, down, or a combination thereof. In one embodiment, the drive system is another chainring, a sprocket, a cassette, or the like which is mechanically coupled to at least one drive wheel.

In one embodiment, unlike prior secondary fastener solutions, the disclosed crank preload collar assembly utilizes a split thread with a "quick release" cam lever to apply a load across the split and circumferentially load the thread to fix the preloader in place. In one embodiment, the cam lever can be actuated without a tool to provide ease of use to the user but can provide a robustness of positional fixing not found in other tool-free preloader solutions.

In one embodiment, unlike prior secondary fastener solutions, the disclosed crank preload collar assembly utilizes a multi-pivot link system, e.g., a 3-piece system, a 2-piece non-pivot system which relies on flex of base material or the like. In one embodiment, instead of a cam lever an integral fastener or snap-fit type system is used.

In the following discussion, and for purposes of clarity, a bicycle is utilized as the example vehicle. However, in another embodiment, the preload collar assembly could be used on any one of a variety of vehicles such as, but not limited to, a bicycle, an electric bicycle (e-bike), a moped, or the like.

Figure 1:
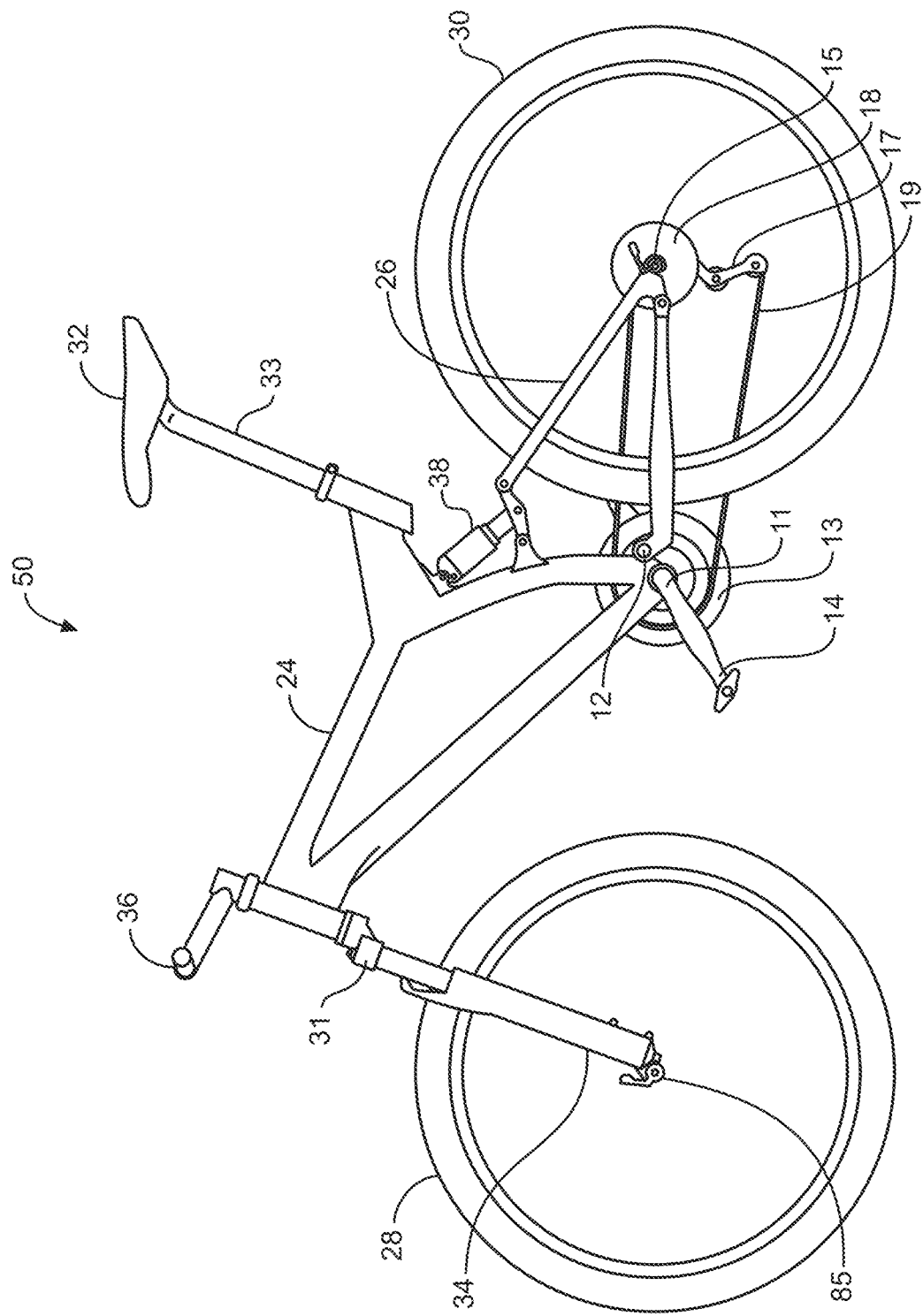
FIG. 1 is a perspective view of a bicycle, in accordance with an embodiment.

Referring now to FIG. 1, a perspective view of a bicycle 50 having a real-time, accurate, adjustable component movement measuring system integrated therewith is shown in accordance with an embodiment. In one embodiment, bicycle 50 has a frame 24 with a suspension system comprising a swing arm 26 that, in use, is able to move relative to the rest of frame 24; this movement is permitted by, inter alia, rear shock assembly 38. The front fork assembly 34 also provide a suspension function via a shock assembly in at least one fork leg.

In one embodiment, bicycle 50 is a full suspension bicycle. In another embodiment, bicycle 50 has only a front suspension and no rear suspension (e.g., a hard tail). In different embodiments, bicycle 50 could be a road bicycle, a mountain bicycle, a gravel bicycle, an electric bicycle (e-bike), a hybrid bicycle, a motorcycle, or the like.

In one embodiment, swing arm 26 is pivotally attached to the frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and front sprocket assembly 13. Although pivot point 12 is shown in a specific location, it should be appreciated that pivot point 12 can be found at a different location depending upon the rear suspension configuration. The use of the pivot point 12 herein is provided merely for purposes of clarity.

For example, in a hardtail bicycle embodiment, there would be no pivot point 12. In one embodiment of a hardtail bicycle, frame 24 and swing arm 26 would be formed as a fixed frame.

Bicycle 50 includes a front wheel 28 which is coupled with the front fork assembly 34 via axle 85. In one embodiment, front fork assembly 34 includes a crown 31. In one embodiment, a portion of front fork assembly 34 (e.g., a steerer tube) passes through the frame 24 and couples with handlebar assembly 36. In so doing, the front fork assembly and handlebars are rotationally coupled with the frame 24 thereby allowing the rider to steer the bicycle 50.

In one embodiment, bicycle 50 includes a rear wheel 30 which is coupled to the swing arm 26 at rear axle 15. A rear shock assembly 38 is positioned between the swing arm 26 and the frame 22 to provide resistance to the pivoting motion of the swing arm 26 about pivot point 12. Thus, the illustrated bicycle 50 includes a suspension member between swing arm 26 and the frame 24 which operate to substantially reduce rear wheel 30 impact forces from being transmitted to the rider of the bicycle 50.

In one embodiment, bicycle 50 is driven by a chain 19 that is coupled with both front sprocket assembly 13 and rear sprocket 18. As the rider pedals, the rotational input to pedal arms 14 cause the front sprocket assembly 13 to rotate about bottom bracket axis 11. This rotation applies a force to chain 19 which transfers the rider generated rotational energy to rear sprocket 18 which results in the rotation of rear wheel 30. Chain tension device 17 provides a variable amount of tension on chain 19. The need for chain 19 length variation can be due to a number of different gears that may be on one or both of front sprocket assembly 13 and/or rear sprocket 18 and/or changes in chain stay length as the distance between bottom bracket axis 11 (where front sprocket assembly 13 attaches to frame 24) and the rear axle 15 changes due to suspension articulation.

In one embodiment, saddle 32 is connected to the frame 24 via seatpost 33. In one embodiment, seatpost 33 is a dropper seatpost.

Figure 2:
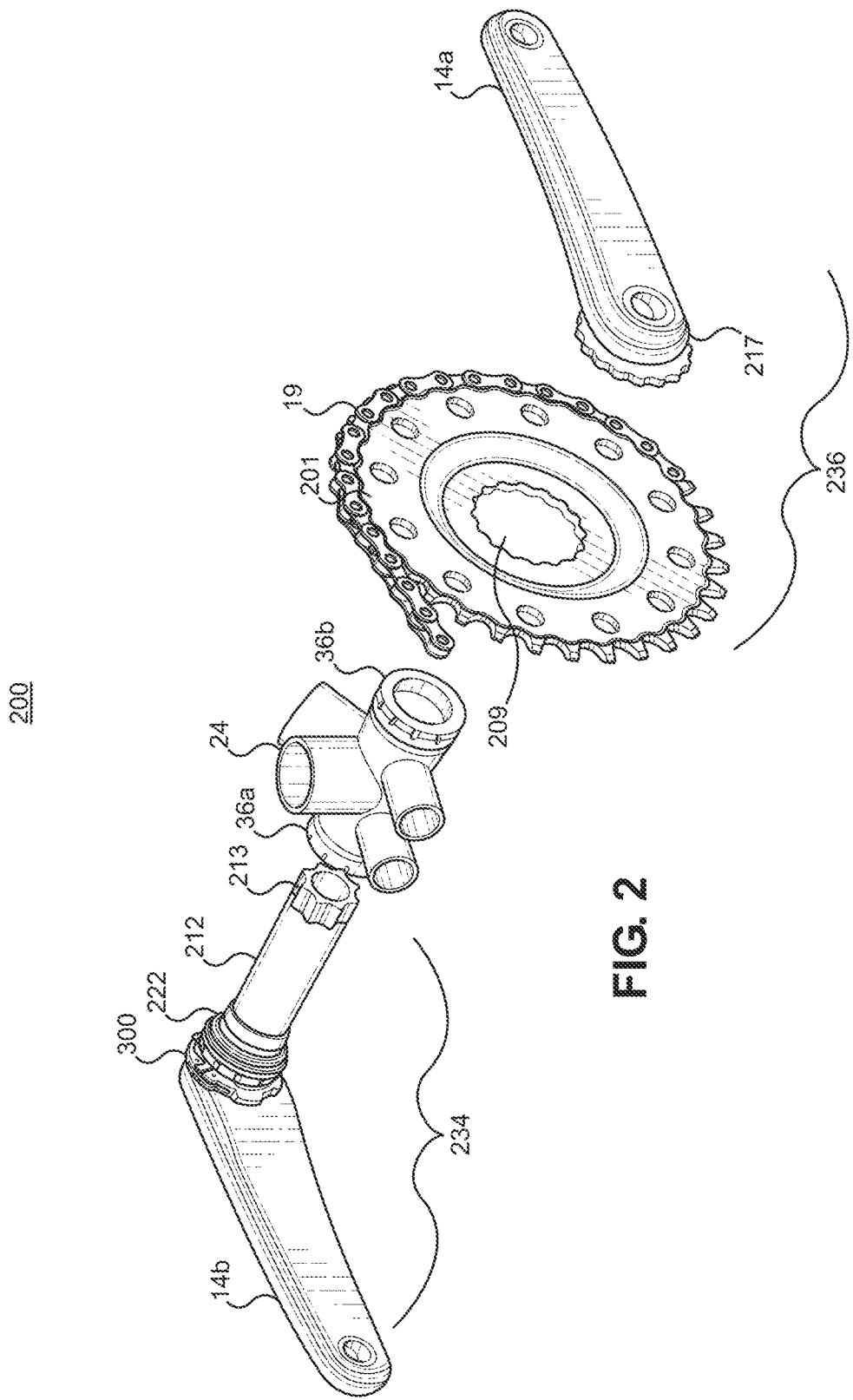
FIG. 2 is an exploded view of a crank assembly, in accordance with an embodiment.

Referring now to FIG. 2, an exploded view of a crank assembly 200 is shown in accordance with an embodiment. In FIG. 2, crank assembly 200 is shown in conjunction with a portion of bicycle frame 24. In one embodiment, bicycle frame 24 includes a bottom bracket shell 36a and a bottom bracket shell 36b.

In one embodiment, crank assembly 200 includes a left-hand non-drive side crank assembly 234 which includes a left-hand crank arm 14b, crank preload collar assembly 300, bottom bracket 222, and a spindle 212 that, in one embodiment includes a spindle interface 213. Some of the components of left-hand non-drive side crank assembly 234 are shown in further detail in FIGS. 3A, 3B, 4A, and 4B.

In one embodiment, crank assembly 200 includes a right-hand drive side crank assembly 236 which includes a right-hand drive side crank arm 14a with a spindle receiving interface 217, a chainring 201 with opening 209, and a roller chain 19. In one embodiment, crank assembly 200 includes additional parts such as, pedals, pedal washers, dust caps, spindle spacers, bearings, hex nuts, and the like. Those parts are not shown for purposes of clarity.

In one embodiment, e.g., during manufacture, assembly, maintenance, rebuild, component replacement, and the like of left-hand non-drive side crank assembly 234, spindle 212 is coupled with left-hand crank arm 14b. In one embodiment, spindle 212 is fixedly coupled with left-hand crank arm 14b at the time of manufacture and/or assembly. In one embodiment, spindle 212 and left-hand crank arm 14b are manufactured as a single component. In one embodiment, spindle 212 and left-hand crank arm 14b are two distinctly different components removably coupled at the time of assembly.

In one embodiment, e.g., during manufacture and/or assembly of the right-hand drive side crank assembly 236, chainring 201 is coupled with right-hand drive side crank arm 14a. In one embodiment, chainring 201 is fixedly coupled with right-hand drive side crank arm 14a at the time of manufacture and/or assembly. In one embodiment, chainring 201 and right-hand drive side crank arm 14a are manufactured as a single component. In one embodiment, chainring 201 and right-hand drive side crank arm 14a are two distinctly different components removably coupled at the time of assembly.

In one embodiment, crank preload collar 300 is fitted to either the spindle 212 or the crank arm 14b. In one embodiment, crank preload collar 300 is threaded onto crank arm 14b and the spindle would just fit into the crank arm.

For example, in one embodiment, to install the crank assembly 200 into frame 24 of bicycle 50, crank preload collar assembly 300 is placed on spindle 212 close to the left-hand crank arm 14b. Bottom bracket 222 is then placed on spindle 212. Spindle 212 is inserted through a portion of bicycle frame 24 (including bottom bracket shell 36a and bottom bracket shell 36b) and opening 209 of chainring 201. Spindle interface 213 is coupled with spindle receiving interface 217 on right-hand drive side crank assembly 236.

In one embodiment, to install the crank assembly 200 into frame 24 of bicycle 50, crank preload collar assembly 300 is placed on a portion of crank arm 14b. At one end, spindle 212 fits into the crank arm 14b. Bottom bracket 222 is then placed on spindle 212. Spindle 212 is inserted through a portion of bicycle frame 24 (including bottom bracket shell 36a and bottom bracket shell 36b) and opening 209 of chainring 201. Spindle interface 213 is coupled with spindle receiving interface 217 on right-hand drive side crank assembly 236.

During the installation of crank assembly 200 into frame 24, one or more bearings (or the like) will be placed around spindle 212 and between bottom bracket 222 and bottom bracket shell 36a before spindle 212 is inserted into frame 24. Once spindle 212 is passed through frame 24, one or more bearings (or the like) will be placed around spindle 212 and between spindle receiving interface 217 and bottom bracket shell 36b.

The one or more bearings (or the like) allow the rotational movement of spindle 212 within the frame 24 while also maintaining a fixed and proper orientation of spindle 212 within frame 24. Once crank assembly 200 is installed, crank preload collar assembly 300 is tightened about spindle 212 or a portion of crank arm 14b. The tightening of crank preload collar assembly 300 will provide a predefined amount of force (or preload force) onto the exterior side of bottom bracket 222 which will translate into a preload force between bottom bracket 222—bottom bracket shell 36a and spindle receiving interface 217—bottom bracket shell 36b.

In other words, if the preload force is not large enough there may be axial movement of the crank arms though the spindle 212. In contrast, if the preload force is too large, bearings may be shredded, e.g., lower bearing life, higher drag, and the like.

For example, the preload force is large enough to maintain the relative positions of bottom bracket 222—bottom bracket shell 36a and spindle receiving interface 217—bottom bracket shell 36b.

The preload force is also large enough to form and maintain an environmental type seal to keep contaminants, water, and the like out of the interior of frame portion 24, the bearings, and the like.

However, in one embodiment, the preload force is a small enough to not cause binding, drag, friction, or other detrimental interactions between one or more of the components of crank assembly 200 and one or more of the components of frame 24. For example, a preload force small enough to not cause binding between one or both of bottom bracket 222—bottom bracket shell 36a and spindle receiving interface 217—bottom bracket shell 36b.

In one embodiment, some or all of the components of crank assembly 200 are made from a material such as ceramic, a metal or metal alloy, for e.g. aluminum, titanium, steel, or the like. In one embodiment, some or all of the components of crank assembly 200 comprise a composite material such as a composite material with a thermoset or thermoplastic matrix, a long or short fiber thermoplastic or thermoset composite, injection molded carbon fiber, carbon fiber reinforced nylon, carbon fiber reinforced epoxy resin, glass filled nylon, a compression molded material, composite layering, chopped carbon fibers, a plastic, polymer, long fiber-reinforced plastics, short-fiber reinforced plastics, or the like. In one embodiment, one, some, or all of the components of crank assembly 200 could be formed from a combination of any of these materials.

Figure 3B:
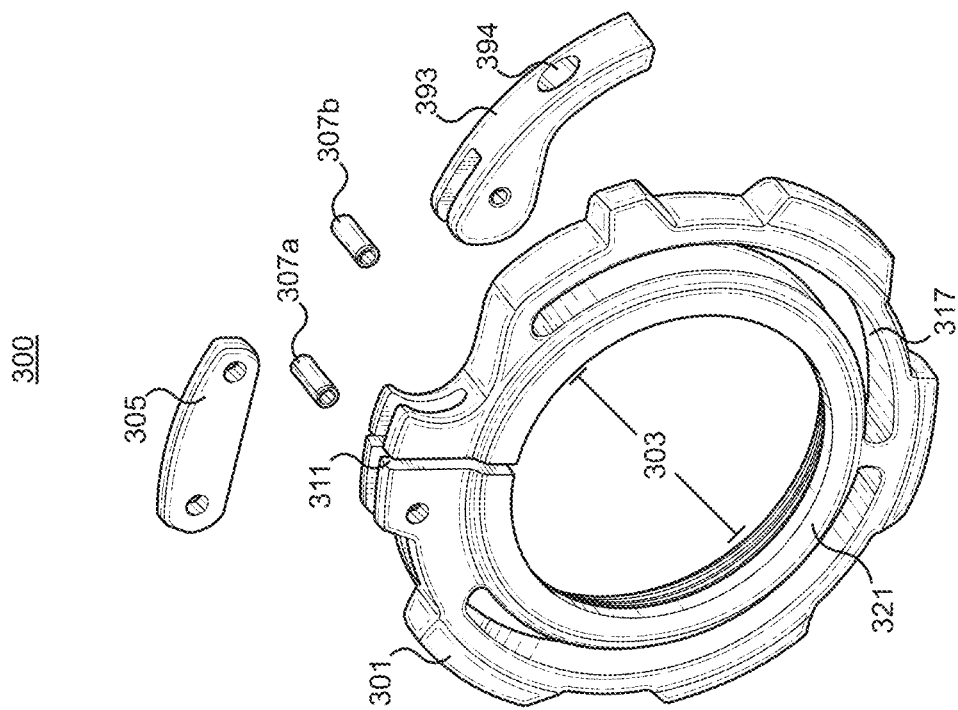
FIG. 3B is an exploded view of the preload collar assembly of FIG. 3A, in accordance with an embodiment.
Figure 3A:
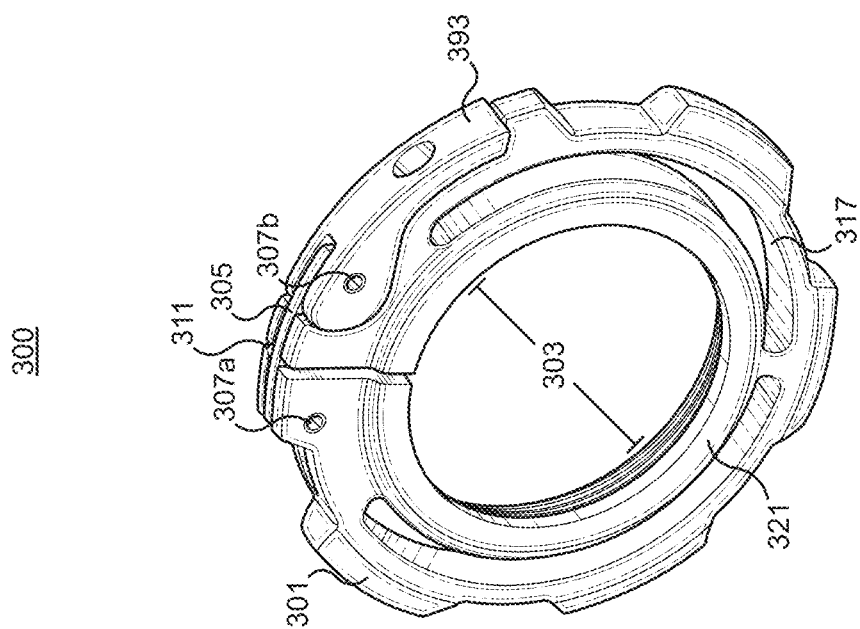
FIG. 3A is a perspective view of the preload collar assembly, in accordance with an embodiment.

Referring now to FIG. 3A is a perspective view of the crank preload collar assembly 300, in accordance with an embodiment. In one embodiment, crank preload collar assembly 300 includes a preload collar body 301, an inner diameter (ID) opening 303 within preload collar body 301, an expandable ring portion 321, a link 305, retainer 307a and retainer 307b, a cam lever 393, a clampable opening 311, and one or more openings 317 therethrough.

With reference now to FIG. 3B is an exploded view of crank preload collar assembly 300, in accordance with an embodiment. In FIG. 3B, the components are shown in an exploded view to obtain a view of each of the preload collar body 301, ID opening 303 within preload collar body 301, expandable ring portion 321, link 305, retainer 307a and retainer 307b, cam lever 393, clampable opening 311, and one or more openings 317 therethrough.

Referring now to FIGS. 3A and 3B, in one embodiment one, some or all of the components of crank preload collar assembly 300 comprise a single material type, such as ceramic, plastics, a polymer, a metal or metal alloy, for example, aluminum, titanium, steel, or the like, a composite material such as a composite material with a thermoset or thermoplastic matrix, a long or short fiber thermoplastic or thermoset composite, injection molded carbon fiber, carbon fiber reinforced nylon, carbon fiber reinforced epoxy resin, glass filled nylon, a composite material with chopped carbon fibers, long fiber-reinforced plastics, short fiber-reinforced plastics, or the like. In one embodiment, one, some, or each of the components of crank preload collar assembly 300 could be formed from different ones of these materials. In one embodiment, one, some, or each of the components of crank preload collar assembly 300 could be formed from a combination of any of these materials.

In one embodiment, one, some, or each of the components of crank preload collar assembly 300 could be formed from a mold, an extrusion, machined, milled, forged, cast, or the like.

In one embodiment, preload collar body 301 has a width (e.g., from the OD of ID opening 303 to the exterior diameter of the preload collar body 301) that is similar to the width of the bottom bracket 222.

In one embodiment, the thickness of preload collar body 301 is based on the application. For example, one manufacturer's crank assembly 200 (or another model of a manufacturer's crank assembly 200) might need a first thickness for the preload collar body 301, while another manufacturer's crank assembly 200 (or another model of a manufacturer's crank assembly 200) might call for a preload collar body 301 having a different second thickness.

In one embodiment, ID opening 303 is a diameter that is large enough to fit about the outside diameter (OD) of spindle 212 or about a portion of crank arm 14b. The diameter of preload collar body 301 could be different based on the application. For example, one manufacturer's crank assembly 200 spindle 212 (or another model of a manufacturer's crank assembly 200 spindle 212) might have a first thickness thereby requiring ID opening 303 to be of a first diameter, while another manufacturer's crank assembly 200 spindle 212 (or another model of a manufacturer's crank assembly 200 spindle 212) might have a different second thickness requiring ID opening 303 to be of a second diameter.

In one embodiment, clampable opening 311 provides the clampable capability for clamping down (e.g., reducing the diameter of ID opening 303) to hold crank preload collar assembly 300 with spindle 212 or a portion of crank arm 14b.

In one embodiment, retainer 307a and retainer 307b are pins. Although pins are shown in the Figures, it should be appreciated that in another embodiment, one or both of retainer 307a and retainer 307b may be the same type of retention device, or two different retention devices selected from a retaining group such as, but not limited to, a pin, a rivet, a screw, a bolt, a threaded bolt, or the like.

In one embodiment, one side (half, quarter, etc.) of link 305 is used in combination with retainer 307a to couple link 305 with preload collar body 301. The other side (half, quarter, etc.) of link 305 is used in combination with retainer 307b to couple link 305 with cam lever 393. In one embodiment, when installed and coupled with retainer 307a and/or 307b, link 305 mechanically couples cam lever 393 with preload collar body 301 about clampable opening 311. In so doing, the operation of cam lever 393 provides leverage to modify the size of clampable opening 311 thereby adjusting the diameter of ID opening 303.

For example, when cam lever 393 is closed the diameter of ID opening 303 will be reduced and crank preload collar assembly 300 will be fixedly held in position with respect to spindle 212 or crank arm 14b. In contrast, when cam lever 393 is opened the diameter of ID opening 303 will be increased as clampable opening 311 expands and crank preload collar assembly 300 will be movable with respect to spindle 212 or crank arm 14b.

In one embodiment, link 305 and/or cam lever 393 are adjustable to modify the clamping force applied to/across clampable opening 311. In one embodiment, the cam lever 393 is finger adjustable, e.g., a user can use their finger, a stick, or the like to open and close cam lever 393 and adjust the preload provided by crank preload collar assembly 300 without requiring a specific tool or even a tool at all.

In one embodiment, cam lever 393 includes an opening 394 therein. In general, opening 394 provides a purchase point for a rider to gain leverage on cam lever 393. For example, if the rider is unable to get a good grasp of cam lever 393 in order to move it into an open position, the user can insert something (e.g., a stick, nail, Allen wrench, pencil, pen, screw, screwdriver, etc.) into the opening 394 to gain a better grip (better leverage, etc.) on cam lever 393 for purposes of assisting in the opening of cam lever 393.

In one embodiment, crank preload collar assembly 300 includes threading that is used in conjunction with threading on spindle 212 or on a portion of crank arm 14b to modify the location and thus the amount of preload force applied by crank preload collar assembly 300 against bottom bracket 222. For example, once the crank assembly 200 is installed into frame 24, the crank preload collar assembly 300 is rotated (e.g., counter clock wise and/or clockwise) to add axial preload to bottom bracket 222. In one embodiment, the rotation of crank preload collar assembly 300 is continued until an appropriate preload force is provided onto the exterior side of bottom bracket 222. This preload force between crank preload collar assembly 300 and bottom bracket 222 will translate into a preload force between bottom bracket 222—bottom bracket shell 36a and spindle receiving interface 217—bottom bracket shell 36b.

In one embodiment, when the cam level 393 is in the closed position, the cam level 393 will fit within a portion of crank preload collar assembly 300 such that the cam lever 393 is maintained in the closed position. In one embodiment, when the cam level 393 is in the closed position, the cam level 393 will rotate past a geometric shape of the detent in preload collar body 301 such that the force applied on preload collar body 301 by the closing of cam lever 393 will keep cam lever 393 maintained in the closed position. In one embodiment, cam lever 393 is sprung to keep the cam lever 393 in the closed position. In one embodiment, cam lever 393 is sprung to keep the cam lever 393 in the open position.

In one embodiment, when the cam level 393 is in the open position, the crank preload collar assembly 300 is easily rotated on the spindle 212 or a portion of crank arm 14b. In contrast, when the cam lever 393 is in the closed position, the crank preload collar assembly 300 is non-rotatably fixed with respect to spindle 212 or a portion of crank arm 14b.

In one embodiment, if cam level 393 is moved further open passed the open position, the cam lever 393 will move into a non-connected position that is free from the detent in preload collar body 301 thereby providing a complete opening of crank preload collar assembly 300. In one embodiment, when cam lever 393 is in the non-connected position crank preload collar assembly 300 can be moved along spindle 212 without requiring interactions with the threads.

Figure 3D:
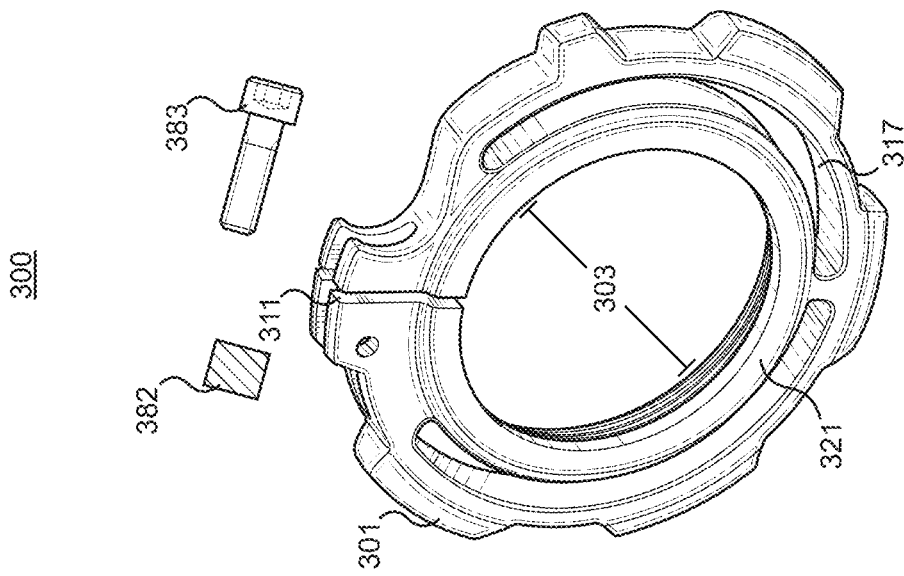
FIG. 3D is an exploded view of the preload collar assembly of FIG. 3C, in accordance with an embodiment.
Figure 3C:
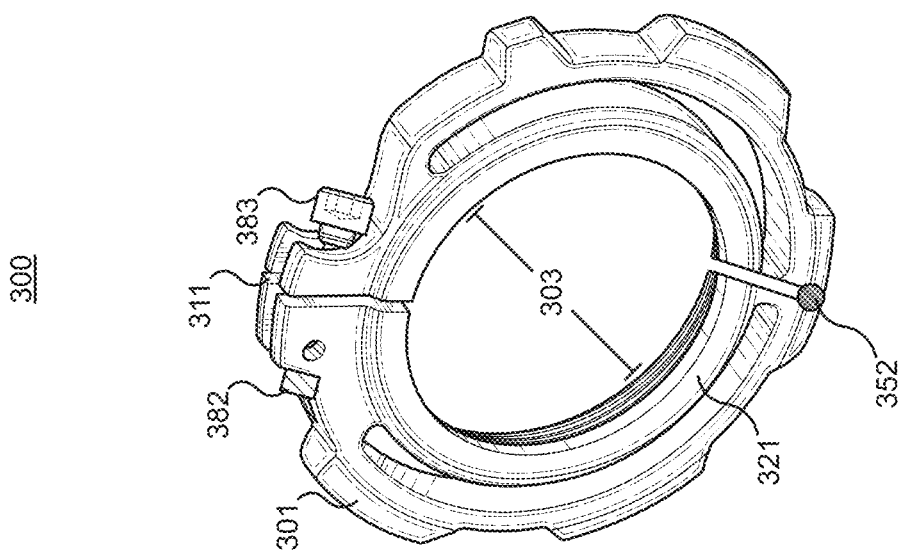
FIG. 3C is a perspective view of the preload collar assembly with a hinge, in accordance with an embodiment.

Referring now to FIG. 3C, a perspective view of the preload collar assembly 300 with a hinge 352 is shown in accordance with an embodiment. FIG. 3D is an exploded view of the preload collar assembly 300 of FIG. 3C shown in accordance with an embodiment.

Referring now to FIGS. 3C and 3D, in one embodiment, crank preload collar assembly 300 has a hinge 352 (pivot point, or the like) at a location such that when the clamping member is in the non-connected position, crank preload collar assembly 300 can be opened wide enough to be removed from (or inserted into) the proper location about spindle 212 or a portion of crank arm 14b without having to disassemble crank assembly 200 or remove crank assembly 200 from bicycle frame 24.

In one embodiment, the clamping member is the link 305 and/or cam lever 393 as shown in FIGS. 3A and 3B. In one embodiment, as shown in FIGS. 3C and 3D, instead of using a link 305 and/or cam lever 393 to provide the clamping forces, one embodiment utilizes another type of clamping member (e.g., bolt 383 and nut 382 or the like) to provide the input needed to close the clampable opening 311 and hold crank preload collar assembly 300 in its preload position.

In one embodiment, instead of (or in addition to) being threaded, expandable ring portion 321 is formed from a material that will expand horizontally (e.g. along the axis of spindle 212) as cam lever 393 is closed. For example, expandable ring portion 321 may be comprised of an expandable material (e.g., rubber, polymer, or the like) and act like an O-ring to provide a preload force between left-hand crank arm 14b and bottom bracket 222 (shown and described in more detail in FIGS. 4A and 4B).

In one embodiment, instead of a cam lever 393, crank preload collar assembly 300 will utilize an integral fastener or snap-fit type system.

In one embodiment, one or more openings 317 are provided to reduce the weight of preload collar body 301. In one embodiment, preload collar body 301 will have no openings 317 therein. In one embodiment, the shape, size, and/or number of openings 317 will be dependent upon the material utilized to manufacture preload collar body 301. For example, the openings 317 may be larger in a preload collar body 301 formed from a stronger material such as aluminum, titanium, carbon fiber, or the like. In another example, the openings 317 may be smaller in a preload collar body 301 formed from a lighter weight material.

In one embodiment, the shape, size, and/or number of openings 317 will be dependent upon the structural design/geometry/weight requirements/strength requirements/wear resistance/or the like, of preload collar body 301.

In one embodiment, the shape, size, and/or number of openings 317 will be dependent upon the structural design (e.g., with respect to thickness) of preload collar body 301. For example, a thicker preload collar body 301 may have one or more openings 317 therein to reduce the weight of the thicker preload collar body 301. In contrast, a thinner preload collar body 301 may have none, one, or more different shaped openings 317 therein based on the structural requirements of the thinner preload collar body 301.

In one embodiment, link 305 and preload collar body 301 are manufactured as one piece to eliminate one of the retainers (e.g., retainer 307a). In one embodiment, when link 305 and preload collar body 301 are manufactured as one piece, the opening and closing of the preload collar assembly will rely on the flex of the preload collar body 301 and the clampable opening 311.

Figure 4A:
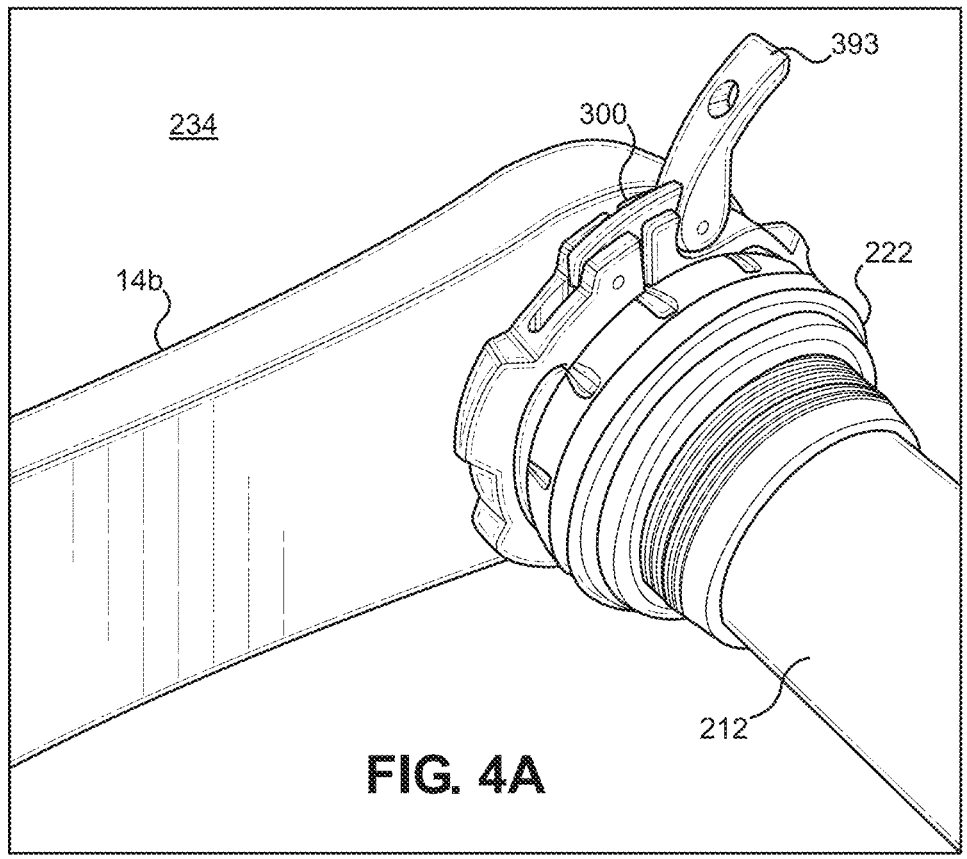
FIG. 4A is a perspective view of the preload collar assembly installed on a portion of a crank assembly in an open position, in accordance with an embodiment.

With reference now to FIG. 4A, a perspective view of crank preload collar assembly 300 installed on a portion of a left-hand non-drive side crank assembly 234, in an open position, is shown in accordance with an embodiment. Referring now to FIGS. 2 and 4A, in one embodiment, left-hand non-drive side crank assembly 234 includes a left-hand crank arm 14b, crank preload collar assembly 300, bottom bracket 222, and a spindle 212 that, in one embodiment includes a spindle interface 213.

In one embodiment, e.g., during manufacture, assembly, maintenance, rebuild, component replacement, and the like of left-hand non-drive side crank assembly 234, spindle 212 is coupled with left-hand crank arm 14b. During installation of the crank assembly 200 with frame 24 of bicycle 50, crank preload collar assembly 300 is placed on spindle 212 close to the left-hand crank arm 14b or on a portion of crank arm 14b. Bottom bracket 222 is then placed on spindle 212. Spindle 212 is inserted through a portion of bicycle frame 24 (including bottom bracket shell 36a and bottom bracket shell 36b) and opening 209 of chainring 201. Spindle interface 213 is coupled with spindle receiving interface 217 on right-hand drive side crank assembly 236.

During the installation of crank assembly 200 into frame 24, one or more bearings (or the like) will be placed around spindle 212 and between bottom bracket 222 and bottom bracket shell 36a before spindle 212 is inserted into frame 24. Once spindle 212 is passed through frame 24, one or more bearings (or the like) will be placed around spindle 212 and between spindle receiving interface 217 and bottom bracket shell 36b.

The one or more bearings (or the like) allow the rotational movement of spindle 212 within the frame 24 while also maintaining a fixed and proper orientation of spindle 212 within frame 24.

Figure 4B:
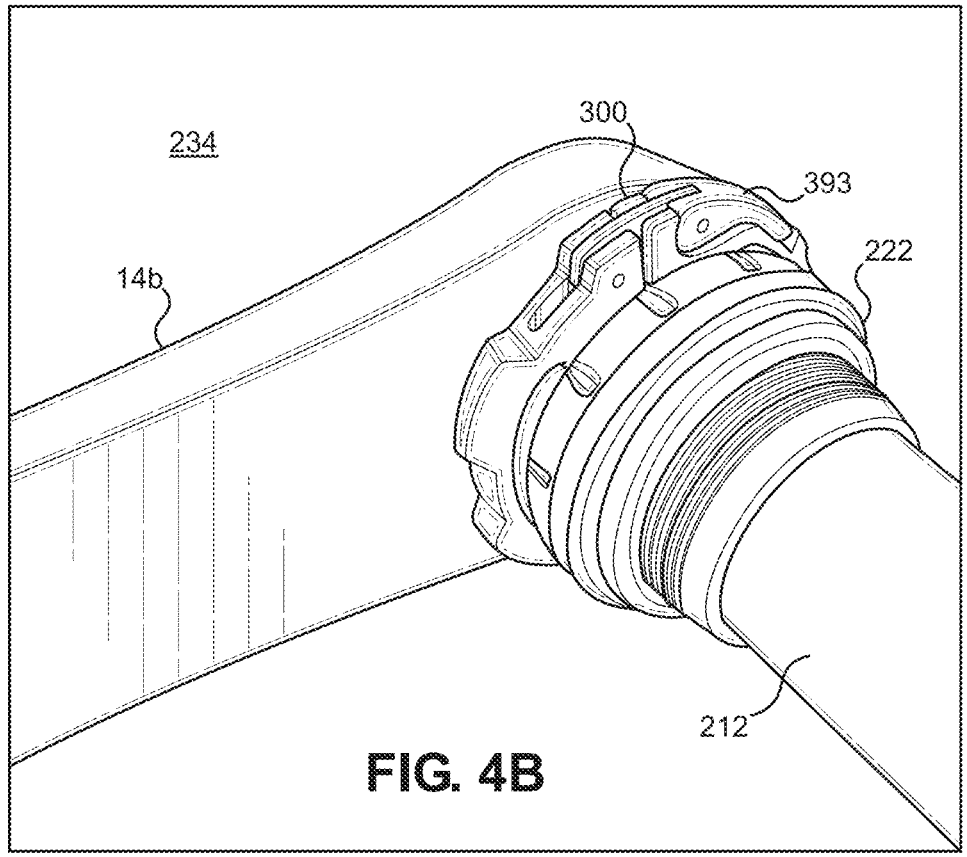
FIG. 4B is a perspective view of the preload collar assembly installed on a portion of a crank assembly in a closed position, in accordance with an embodiment.

Referring now to FIG. 4B is a perspective view of crank preload collar assembly 300 installed on a portion of a left-hand non-drive side crank assembly 234, in a closed position, is shown in accordance with an embodiment.

As described herein, cam lever 393 is coupled with preload collar body 301 about clampable opening 311. In so doing, the operation of cam lever 393 provides leverage to modify the size of clampable opening 311 thereby adjusting the diameter of ID opening 303.

In one embodiment, when cam lever 393 is opened the diameter of ID opening 303 will be increased as clampable opening 311 expands and crank preload collar assembly 300 will be movable with respect to spindle 212 or to crank arm 14b. In contrast, when cam lever 393 is closed the diameter of ID opening 303 will be reduced and crank preload collar assembly 300 will be fixedly held in position with respect to spindle 212 or to crank arm 14b. In one embodiment, link 305 and/or cam lever 393 are adjustable to modify the clamping force applied to/across clampable opening 311.

In one embodiment, crank preload collar assembly 300 includes threading that is used in conjunction with threading on spindle 212 or on a portion of crank arm 14b to modify the location and thus the amount of preload force applied by crank preload collar assembly 300 against bottom bracket 222. For example, once the crank assembly 200 is installed into frame 24, the crank preload collar assembly 300 is rotated (e.g., counter clock wise and/or clockwise) to add axial preload to bottom bracket 222. In one embodiment, the rotation of crank preload collar assembly 300 is continued until an appropriate amount of preload force is provided onto the exterior side of bottom bracket 222. This amount of preload force between crank preload collar assembly 300 and bottom bracket 222 will translate into an appropriate amount of preload force between bottom bracket 222—bottom bracket shell 36a and spindle receiving interface 217—bottom bracket shell 36b.

In general, the preload force is large enough to maintain the relative positions of bottom bracket 222—bottom bracket shell 36a and spindle receiving interface 217—bottom bracket shell 36b. The preload force is also large enough to form and maintain an environmental type seal to keep contaminants, water, and the like out of the interior of frame portion 24, the bearings, and the like.

However, in one embodiment, the preload force is small enough to not cause binding between one or more of the components of crank assembly 200 and one or more of the components of frame 24. For example, a small enough preload force to not cause binding between one or both of bottom bracket 222—bottom bracket shell 36a and spindle receiving interface 217—bottom bracket shell 36b.

In one embodiment, as disclosed herein, the crank preload collar assembly 300 utilizes a split thread with a "quick release" cam lever to apply a load across the split and circumferentially load the thread to fix the preloader in place. In one embodiment, the cam lever can be actuated without a tool to provide ease of use to the user but can provide a robustness of positional fixing not found in other tool-free preloader solutions.

In one embodiment, instead of (or in addition to the threads) expandable ring portion 321 is formed from a material that will expand horizontally (e.g. along the axis of spindle 212) as cam lever 393 is closed. For example, expandable ring portion 321 may be comprised of an expandable material (e.g., rubber, polymer, or the like) and act like an O-ring to provide a preload force between left-hand crank arm 14b and bottom bracket 222.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A crank preload collar assembly comprising:
a preload collar body having an axial opening therein, said axial opening therein to fit around a spindle and a portion of a crank arm of a crank assembly;
a clampable opening formed in a portion of said preload collar body;
a cam lever coupled with both sides of said clampable opening wherein said cam lever provides a clamping force to said preload collar body with respect to said spindle and said portion of said crank arm, wherein a tightening of said crank preload collar assembly provides an axial load between said crank arm and a bottom bracket to mitigate manufacturing tolerances and to prevent unwanted movement between said crank arm and said spindle, wherein said tightening of said crank preload collar assembly provides said axial load between said crank arm and said bottom bracket without requiring a separate tool to affix said crank preload collar assembly with respect to said spindle and said portion of said crank arm;

a plurality of spindle threads formed about said spindle, said plurality of spindle threads to retain said preload collar body with respect to said spindle; and a plurality of crank arm threads formed about said portion of said crank arm, said plurality of crank arm threads to retain said preload collar body with respect to said portion of said crank arm.

2. The crank preload collar assembly of claim 1, wherein said cam lever is openable and closeable without a tool.

3. The crank preload collar assembly of claim 1, further comprising:

an expandable ring portion, said expandable ring portion disposed about at least a portion of an interior diameter of said preload collar body, said expandable ring portion configured to expand horizontally along an axis of said spindle as said cam lever is closed, said expandable ring portion to retain said preload collar body with respect to said spindle.

4. The crank preload collar assembly of claim 1, further comprising:

an expandable ring portion, said expandable ring portion disposed about at least a portion of an interior diameter of said preload collar body, said expandable ring portion configured to expand horizontally along an axis of said portion of said crank arm as said cam lever is closed, said expandable ring portion to retain said preload collar body with respect to said portion of said crank arm.

* * * * *